(12) United States Patent
Tazawa et al.

(10) Patent No.: US 7,049,039 B2
(45) Date of Patent: *May 23, 2006

(54) COLORING AGENT FOR TONER, AND TONER

(75) Inventors: Yayoi Tazawa, Shizuoka (JP); Yasukazu Ayaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 295 days.

This patent is subject to a terminal disclaimer.

(21) Appl. No.: 10/151,140

(22) Filed: May 21, 2002

(65) Prior Publication Data

US 2003/0027071 A1    Feb. 6, 2003

(30) Foreign Application Priority Data

May 24, 2001    (JP)    ............................. 2001-154782

(51) Int. Cl.
*G03G 9/09* (2006.01)
*C08K 5/23* (2006.01)
*C08K 5/09* (2006.01)

(52) U.S. Cl. ............................. 430/108.23; 430/108.4; 430/108.5; 430/137.11; 430/137.17; 106/471; 106/493; 106/499; 106/503; 106/505

(58) Field of Classification Search ........... 430/108.21, 430/108.23, 110.1, 110.2, 108.9, 108.1, 108.5, 430/108.4, 108.2, 108.3, 137.1, 137.11, 137.17; 106/413, 499, 500, 476, 491, 494, 493, 498, 106/497, 448, 460, 471, 495, 496, 503, 505; 428/403, 407

See application file for complete search history.

(56) References Cited

U.S. PATENT DOCUMENTS

| | | | | |
|---|---|---|---|---|
| 4,291,112 A | * | 9/1981 | Lu | ........................... 430/108.2 |
| 4,846,893 A | * | 7/1989 | Akasaki et al. | ............. 106/500 |
| 5,217,839 A | | 6/1993 | Yamada et al. | |
| 5,326,392 A | * | 7/1994 | Miller et al. | ................. 106/417 |
| 5,529,873 A | * | 6/1996 | Chiba et al. | ............. 430/108.8 |
| 5,718,754 A | * | 2/1998 | Macpherson et al. | ....... 106/413 |
| 6,808,855 B1 | * | 10/2004 | Ayaki et al. | ............. 430/110.2 |
| 2003/0073020 A1 | * | 4/2003 | Ayaki et al. | ............. 430/110.2 |
| 2003/0217676 A1 | * | 11/2003 | Palumbo | ..................... 106/473 |

FOREIGN PATENT DOCUMENTS

| | | | |
|---|---|---|---|
| JP | 05-107810 | * | 4/1993 |
| JP | 6-167833 | | 6/1994 |
| JP | 7-84410 | | 3/1995 |
| JP | 8-10354 | | 1/1996 |
| JP | 11-7163 | | 1/1999 |
| JP | 2859950 | | 2/1999 |
| JP | 2001-187764 | * | 7/2001 |

OTHER PUBLICATIONS

Derwent English-Language Translation of JP 05-107810 (pub Apr./1993).*
Whelan, T., consultant, *Polymer Technology Dictionary*, Chapman & Hall, NY (1994), p. 33.*
Japanese Patent Office machine-assisted translation of JP 2001-187764 (pub. Jul. 2001).*
Grant, R. et. al., ed. *Grant & Hackh's Chemical Dictionary*, 5th ediition, McGraw-Hill Book Company, NY (1987), p. 115.*

* cited by examiner

*Primary Examiner*—Janis L. Dote
(74) *Attorney, Agent, or Firm*—Fitzpatrick, Cella, Harper & Scinto

(57) ABSTRACT

A coloring agent for use in toners which comprises coloring particles modified with a surface modifier having in one molecule a hydrophilic moiety, a hydrophobic moiety, and a reactive moiety between the hydrophilic moiety and the hydrophobic moiety. Also disclosed is a toner comprising toner particles containing at least a binder resin and a coloring agent comprising the above surface-modified coloring particles.

8 Claims, No Drawings

COLORING AGENT FOR TONER, AND TONER

BACKGROUND OF THE INVENTION

1. Field of the Invention

This invention relates to a coloring agent for use in toners, and a toner for developing electrostatic latent images or a toner for forming toner images in image-forming methods of a toner jet system. More particularly, this invention relates to a coloring agent the particle surfaces of which have been modified.

2. Related Background Art

Commonly available processes for producing toner particles of toners for developing electrostatic latent images and of toners used in image-forming methods of a toner jet system are known to include a pulverization process in which a binder resin and a coloring agent are melt-kneaded and the kneaded product is pulverized, and a polymerization process including dispersion polymerization such as suspension polymerization in which a fluid dispersion prepared by dispersing a coloring agent and so forth in a monomer or monomers for forming a binder resin is suspended in water to effect polymerization, or emulsion polymerization, and a process in which all constituents of toner particles, including a binder resin, are dissolved or dispersed in an organic solvent and the resultant solution or fluid dispersion is suspended in water followed by removal of the solvent to effect granulation.

In the above production processes, how the coloring agent be dispersed in toner particles in a good efficiency is an important item for improving the chroma, degree of pigmentation and transparency on OHT (overhead-projection transparent sheet) of toners, and various researches and proposals have been made thereon.

As one of processes for producing toner particles, a production process is known in which a mechanical or other method is used to incorporate a coloring agent into surface portions of toner particles comprised of at least a binder resin. In such toners in which the coloring agent is relatively much present at the surfaces of toner particles produced by such a production process or the pulverization process, it is considered difficult to attain a sufficient charge quantity in many cases.

To cope with such a problem, the following proposals have been made in order to overcome this problem by modifying particle surfaces of the coloring agent.

In Japanese Patent Application Laid-open No. 6-167833, a method is proposed in which a pigment is made to adsorb a copolymer of at least one monomer selected from a vinyl aromatic hydrocarbon and an acrylate or methacrylate monomer with sodium styrenesulfonate, in an attempt to improve the dispersibility of the pigment in the toner particles in a process for producing toner particles by polymerization.

In Japanese Patent No. 2859950, as a method of improving the dispersibility of a coloring agent in the pulverization process or the process in which a solution or fluid dispersion prepared by dissolving or dispersing a binder resin and other materials in an organic solvent is dispersed in water to effect granulation to obtain toner particles, a method is proposed in which a compound having at least one >C═N< linkage in the molecular is used as a dispersing agent of the coloring agent.

In Japanese Patent Application Laid-open No. 7-84410, as a method of improving the dispersibility of a coloring agent when toner particles are produced by using suspension polymerization, a method is proposed in which the coloring agent is dispersed in a polymerizable monomer together with a peroxide type polymerization initiator and a polymerization initiator is further added to effect suspension polymerization.

In Japanese Patent Publication No. 8-10354, a method is proposed in which a polymerization initiator is added to a fluid dispersion prepared by adding a coloring pigment to a polymerizable monomer containing an organic peroxide having an alkyl group having 13 or more carbon atoms, followed by suspension polymerization of this polymerizable monomer in an aqueous medium to produce toner particles.

These methods, however, are methods in which a fluid dispersion of a coloring agent is prepared or the particle surfaces of a coloring agent are modified in the course of the production of toner particles. Such methods are insufficient for achieving an object that sufficient charge quantity can be retained even where the coloring agent stands bare to the particle surfaces.

In Japanese Patent Application Laid-open No. 11-7163, a method is also proposed in which a pigment is encapsulated so as to improve the dispersibility of the pigment and also to put off any shortage of charge quantity which is due to the pigment coming bare to any broken surfaces in toner particles obtained by pulverization. However, the method of encapsulating the pigment proposed here, which is typified by a hetero-agglomeration method, requires a large number of steps or makes it necessary to control the pH delicately.

In the past, a method has been proposed in which azo groups or peroxide groups are chemically joined to particle surfaces of a coloring agent and a polymeric compound is grown therefrom as base points to coat the particle surfaces of the coloring agent with a resin. This method is effective where the coloring agent has highly reactive groups on its particle surfaces like carbon black. However, where the particle surfaces are inert or low-reactive like commonly available organic or inorganic coloring agents, it is usually difficult to make such groups join chemically to the particle surfaces of such coloring agents. Thus, it has been difficult to modify particle surfaces of coloring agents.

SUMMARY OF THE INVENTION

An object of the present invention is to provide a coloring agent for use in toners the particle surfaces of which coloring agent have been modified by a very simple method, different from the methods of improving the dispersion of pigments as discussed above.

Another object of the present invention is to provide a coloring agent for use in toners, whose dispersibility in toner particles has been improved and which can achieve the improvement in chroma, degree of pigmentation and transparency on OHT of the toner and can retain sufficient charge quantity even where the coloring agent stands bare to the particle surfaces; and a toner containing such a coloring agent.

To achieve the above objects, the present invention provides a coloring agent for use in toners which comprises coloring particles modified with a compound for modifying the surfaces of the coloring particles; the compound having a hydrophilic moiety, a hydrophobic moiety, and a reactive moiety between the hydrophilic moiety and the hydrophobic moiety.

The present invention also provides a toner which comprises toner particles containing at least a binder resin and a coloring agent;

the coloring agent comprising coloring particles modified with a compound for modifying the surfaces of the coloring particles; the compound having a hydrophilic moiety, a hydrophobic moiety, and a reactive moiety between the hydrophilic moiety and the hydrophobic moiety.

DETAILED DESCRIPTION OF THE INVENTION

The present inventors have made extensive studies on methods by which the particle surfaces of coloring agents can be coated with resins in modifying particle surfaces of coloring agents for use in toners. As the result, they have discovered that the above objects can be achieved by a surface modifier having in one molecule a hydrophilic moiety and a hydrophobic moiety and also a reactive moiety between them. Thus, they have accomplished the present invention.

The surface modifier used in the present invention is characterized by having in one molecule both a hydrophobic moiety and a hydrophilic moiety. Compounds having in one molecule both a hydrophobic moiety and a hydrophilic moiety shows that this molecule has surface-active performance. The use of such a surface modifier as a surface-active agent enables introduction of reactive moieties into particle surface portions of the coloring agent without regard to its surface properties. A resin may be allowed to react with such reactive moieties serving as base points, thus the particle surfaces of the coloring agent can firmly be coated with the resin.

The surface modifier used in the present invention has a hydrophobic moiety, a hydrophilic moiety and a reactive moiety. Those which are usable as groups which form the respective moieties are enumerated below.

As the hydrophobic moiety (hydrophobic group), a saturated or unsaturated, chainlike or branched aliphatic hydrocarbon group, an aromatic hydrocarbon group, a heterocyclic group or a polysiloxane residual group may be used.

The aliphatic hydrocarbon group may include saturated or unsaturated, chainlike or branched-chain aliphatic hydrocarbon groups; saturated or unsaturated, cyclic aliphatic hydrocarbon groups; and saturated or unsaturated, polycyclic hydrocarbon groups.

The saturated or unsaturated, chainlike or branched-chain aliphatic hydrocarbon groups may include alkyl groups having 5 to 60 (preferably 6 to 30) carbon atoms, such as hexyl, pentyl, 2-ethylhexyl, heptyl, octyl, nonyl, decyl, undecyl, dodecyl (lauryl), tridecyl, tetradecyl, pentadecyl, hexadecyl (cetyl), heptadecyl, octadecyl, nonadecyl, elcosyl, docosyl, hexacosyl (ceryl), triacontyl, hentriacontyl (melissyl), and α-olefin polymers; alkenyl groups having 5 to 60 (preferably 6 to 30) carbon atoms, such as hexenyl, tridecenyl, octadecadienyl, octadecenyl, nonadecenyl, docosenyl, hexacosenyl, and α-olefin polymers (olefinic oligomers having an unsaturated double bond); and alkynyl groups having 5 to 60 (preferably 6 to 30) carbon atoms, such as hexynyl and nonadecynyl.

The saturated or unsaturated, cyclic aliphatic hydrocarbon groups may include cycloalkenyl groups having 6 to 60 (preferably 6 to 20) carbon atoms, such as cyclopentyl, cyclohexyl, cycloheptyl, cyclooctyl, cyclodecyl, cyclododecyl and cyclopentadecyl.

The saturated or unsaturated, polycyclic hydrocarbon groups may include groups corresponding to bicyclic hydrocarbon groups (cross-linked monocyclic saturated or unsaturated hydrocarbon groups) such as carane, pinane, bornane, norpinane and norbornane; and groups corresponding to tricyclic hydrocarbon groups (cross-linked polycyclic saturated or unsaturated hydrocarbon groups) such as adamantane.

The aromatic hydrocarbon group may include aryl groups such as phenyl, naphthyl, biphenyl, fluorenyl, anthracenyl, phenanthrenyl, benzanthracenyl, pyrenyl, triphenylenyl and peryrenyl; and alkyl-aryl groups such as isopropylphenyl, butylphenyl, amylphenyl, hexylphenyl, octylphenyl, nonylphenyl, decylphenyl, dodecylphenyl and tetradecylphenyl. The aromatic hydrocarbon group may preferably have 6 to 60 carbon atoms.

The heterocyclic group may include crown ethers such as 12-crown-4, 15-crown-5, 18-crown-6, dicyclohexano-24-crown-8, dibenzo-18-crown-6, cyclene, hexacyclene, 1-aza-12-crown-4, 1-aza-15-crown-5 and 1-aza-18-crown-6; heterocyclic compounds having an oxygen or nitrogen atom as a hetero-atom, such as tetraoxadiazacyclooctadecane and pentaoxadiazabicyclotricosane; porphyrins such as ethioporphyrin, octaethylporphyrin, protoporphyrin, hematoporphyrin, coproporphyrin, mesoporphyrin and tetraphenylporphyrin; and phthalocyanine, and naphthalocyanine.

The heterocyclic group may hold a metal in the skeleton. The metal may include alkali metals such as lithium, sodium and potassium; alkaline earth metals such as magnesium; periodic-table Group 13 metals such as aluminum and gallium; periodic-table Group 14 metals such as silicon, tin and lead; and transition metals such as vanadium, manganese, iron, cobalt, nickel, ruthenium, copper and zinc. An anion for any of these metals may also be present together. Such an anion may include halogen ions, organic-acid ions such as an acetate ion, inorganic-acid ions such as a sulfate ion, a tetrafluoroboron ion, and a hexafluorophosphorus ion.

The polysiloxane residual group may include, e.g., a group represented by the following formula:

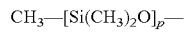

$$CH_3-[Si(CH_3)_2O]_p-$$

wherein p represents an integer of 5 to 30, and preferably 10 to 20.

The hydrophobic group may also include composite hydrophobic groups formed of hydrophobic groups of different types which stand linked with each other.

These hydrophobic groups may have a substituent of various types. The substituent may include a carbonyl group, a thiocarbonyl group, halogen atoms such as a fluorine atom, a chlorine atom, a bromine atom and an iodine atom, a hydroxy group, a mercapto group, an oxime group, an imino group, an isocyanato group (isocyanate group), a thioisocyanato group (thioisocyanate group), a cyano group, primary to tertiary amino groups, a nitro group, a carboxyl group, chainlike hydrocarbon groups such as alkyl groups having 1 to 12 carbon atoms, and monocyclic aliphatic hydrocarbon groups such as cycloalkyl groups having 3 to 16 carbon atoms. It may specifically include, e.g., perfluorophenyl, perfluoropentyl and perfluorododecyl.

Preferred hydrophobic groups may be groups capable of showing hydrophobic function sufficiently as a surface-active agent. Such groups may include, e.g., long-chain aliphatic hydrocarbon groups having 6 to 30 carbon atoms, such as nonyl, dodecyl (lauryl), tetradecyl, hexadecyl (cetyl) and octadecyl; aryl groups having 6 to 20 carbon atoms which have an alkyl group having 1 to 20 carbon atoms (in particular, phenyl groups which have an alkyl group having 1 to 18 carbon atoms), such as octylphenyl, nonylphenyl, decylphenyl and dodecylphenyl. If this hydrophobic group has carbon atoms fewer than the above range, the hydrophobicity required as the hydrophobic group may lower. If it has carbon atoms more than the above range, the hydrophobicity may conversely be so strong that the surface modifier may come only slightly soluble or insoluble in water. In such a case, it is difficult for the surface modifier to show sufficient surface activity, bringing about a high possibility of causing a difficulty that an auxiliary surface-active agent must be used in a larger quantity.

The hydrophilic moiety (hydrophilic group) may include nonionic groups as exemplified by a polysaccharide group and a hydroxyl group, anionic groups as exemplified by a sulfuric ester group, a sulfate, a sulfonic acid group, a carboxyl group, a carboxylate, a phosphoric ester group and a phosphate, and cationic groups as exemplified by a heterocyclic group, a heterocyclic salt, an amino group and an ammonium salt. Any of these hydrophilic groups may be used alone or in combination of two or more types.

The polysaccharide group may include sucrose esters, sorbitol, sorbitan, and sorbitan ester residual groups.

Where the hydrophilic group is an anionic group such as carboxylic acid or sulfonic acid, it may form a salt with a base. Such a base may include inorganic bases as exemplified by alkali metals such as lithium, sodium and potassium and alkaline earth metals such as magnesium, and organic bases as exemplified by amines.

The heterocyclic group may include groups corresponding to heterocyclic rings of 5 to 8 members, containing as a hetero-atom at least one atom selected from a nitrogen atom, an oxygen atom and a sulfur atom. In particular, a quaternary ammonium salt of a heterocyclic group having a nitrogen atom as a hetero-atom is preferred. For example, it may include a heterocyclic group represented by the following formula:

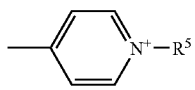

wherein $R^5$ represents an alkyl group.

The alkyl group represented by $R^5$ may include lower alkyl groups having 1 to 6 carbon atoms, such as methyl, ethyl, propyl and hexyl.

The amino group may include primary to quaternary amino groups. In the case of primary to tertiary amino groups, they may form salts or amides with an inorganic acid as exemplified by hydrochloric acid or an organic acid as exemplified by acetic acid. Secondary to quaternary ammonium salts may include mono- to tetra-alkylamino groups having 1 to 30 carbon atoms, such as methylamino, dimethylamino, diethylamino, trimethylamino, tetramethylamino and trimethyllauryl; and mono- to tetra-arylamino groups having 6 to 12 carbon atoms, such as phenylamino and diphenylamino. The cationic group, in particular, the amino group may form an amphoteric ionic group together with the anionic group, in particular, the carboxyl group or the sulfuric acid group. The groups which form such an amphoteric ion may include a carboxyethylamino group, a dihydroxymethylamino group, a dicarboxyethylamino group and a sulfuric acid amino group.

The hydrophilic group may be substituted with a substituent of various types. The substituent may include the substituents exemplified in the above paragraph for the hydrophobic group. The hydrophilic group may also include composite hydrophilic groups in which hydrophilic groups of different types are linked to each other.

Preferred hydrophilic groups may be hydrophilic groups capable of showing hydrophilic function sufficiently as a surface-active agent. Such groups may include, e.g., a carboxyl group, a sulfuric acid group, a sulfonic acid group, salts of these, and a polyether group.

With regard to the reactive moiety (reactive group), at least one group must be contained in one molecule of the surface modifier, and may preferably be a group capable of generating radicals, cations or anions by heat or light. Such a group may include, e.g., an azo group, a peroxide group and a diketo group.

The surface modifier in the present invention may, taking account of its stability and functioning performance, preferably be a compound represented by the following Formula (1):

$$R^1\text{---}X\text{-}Z\text{-}Y\text{---}R^2 \quad (1)$$

wherein $R^1$ is the hydrophobic group, $R^2$ is the hydrophilic group, Z is the reactive group, and X and Y represent units which link with the groups represented by $R^1$ or $R^2$, respectively, and Z.

In the above formula, Z may represent an azo group, and X and Y may be the same or different and may represent units having a carbon-carbon bond, an ester linkage, an amide linkage, an ether linkage, a urethane linkage or a urea linkage. Any one of the units represented by X and Y may preferably have an electron-attracting group.

What the units X and Y are depends on the types of the groups $R^1$ or $R^2$ and Z. Usually, the units X and Y are units having a bond or linkage formed upon the reaction of terminals of the group $R^1$ or $R^2$ with terminals of the group Z. As types of the bond or linkage, it may include a carbon-carbon bond, an ester linkage, an amide linkage, an ether linkage, a urethane linkage and a urea linkage. For example, where one terminal of the group $R^1$ or $R^2$ and group Z is a carboxyl group and the other terminal thereof is a hydroxyl group, the group X has an ester linkage. Where one terminal of the group $R^1$ or $R^2$ and group Z is a hydroxyl group and the other terminal thereof is an isocyanate group, the group X may preferably be a urethane linkage. Where one terminal of the group $R^1$ or $R^2$ and group Z is an amino group and the other terminal thereof is a carboxyl group, the group X may preferably have an amide group. Also, where one terminal of the group $R^1$ or $R^2$ and group Z is an amino group and the other terminal thereof is an isocyanate group, the group X may preferably have a urea linkage.

As to the units X and Y, any one of them may preferably have an electron-attracting group. Usually, the reactive group Z is a radical-generating group. In order to stabilize the reactive group Z, the carbon atom adjoining to the reactive group may preferably have an electron-attracting group as exemplified by a cyano group, a halogen group or an amino group.

Where in the above Formula (1) the reactive group Z is an azo group (—N=N—), the units X and Y may preferably be alkylene groups having 2 to 4 carbon atoms and having a methyl group and a cyano group on the carbon atoms adjoining to the azo group. Where the reactive group Z is a peroxide group (—O—O—), the units X and Y may usually preferably be alkylene groups having methyl groups on the carbon atoms adjoining to the peroxide group, as exemplified by 1,1-dimethyl-1-phenylmethyl group and 1,1-dimethylethyl group. Where the reactive group Z is an ester type peroxide group [—O(=O)—O—O—C(=O)—], the units X and Y may be phenyl groups or long-chain alkyl groups as exemplified by lauryl groups. Where the reactive group Z is a diketo group [—O(=O)—C(=O)—], the units X and Y may be phenyl groups.

In the compound represented by the above Formula (1), a preferred surface modifier may further include a compound represented by the following Formula (2):

$$R^{1a}\text{-}A^1\text{-}R^3\text{---}N\text{=}N\text{---}R^4\text{-}A^2\text{-}R^{2a} \quad (2)$$

wherein $R^{1a}$ is a long-chain aliphatic hydrocarbon group having 6 to 30 carbon atoms, or an aryl group having 6 to 12 carbon atoms which has an alkyl group having 1 to 20 carbon atoms (the former carbon atoms excluding those of the alkyl group moiety); $R^{2a}$ is a carboxyl group, a carboxylic acid group, a sulfuric ester group, a sulfate, a sulfonic acid group, a sulfonic acid group having a salt structure, or an aliphatic or aromatic hydrocarbon group having 1 to 20 carbon atoms which has at least one of these groups as a substituent; $R^3$ and $R^4$ may be the same or different and are alkylene groups having electron-attracting groups on the carbon atoms adjoining to the azo group; $A^1$ may be absent, or represents at least one linkage selected from an ester linkage, an amide linkage, a urethane linkage and an ether linkage; and $A^2$ may be absent, or represents at least one linkage selected from an ester linkage, an amide linkage, a urethane linkage and an ether linkage.

The alkylene groups represented by $R^3$ and $R^4$ may include alkylene groups having 1 to 6 carbon atoms, preferably 2 to 6 carbon atoms, such as methylene, ethylene, propylene and tetramethylene.

More preferably, in the above Formula (2), $R^{1a}$ may be a long-chain aliphatic hydrocarbon group having 10 to 22 carbon atoms, or a phenyl group which has as a substituent an alkyl group having 1 to 18 carbon atoms; $R^{2a}$ may be a carboxyl group, a carboxylic acid group, a sulfuric ester group, a sulfate, a sulfonic acid group, a sulfonic acid group having a salt structure, or an aliphatic hydrocarbon group having 1 to 20 carbon atoms or aromatic hydrocarbon group having 6 to 20 carbon atoms each of which groups has at least one of these groups as a substituent; $R^3$ and $R^4$ may be the same or different and may be alkylene groups having 2 to 6 carbon atoms and having cyano groups on the carbon atoms adjoining to the azo group; $A^1$ may be absent, or may represent at least one linkage selected from an ester linkage and an amide linkage; and $A^2$ may be absent, or may represent at least one linkage selected from an ester linkage and an amide linkage.

There are no particular limitations on processes for producing the surface modifier, and any processes may be used as long as compounds having satisfied the above requirements can be produced.

The surface modifier can be dissolved or dispersed in various solvents and can disperse the coloring agent in a stated medium. There are no particular limitations on the medium. It may include, e.g., aqueous mediums such as water; aliphatic hydrocarbons such as hexane; alicyclic hydrocarbons such as cyclohexane; aromatic hydrocarbons such as toluene and xylene; alcohols such as methanol, ethanol, isopropyl alcohol and butanol; ethers such as diethyl ether, diisopropyl ether, dioxane and tetrahydrofuran; esters such as ethyl acetate and butyl acetate; and ketones such as acetone, methyl ethyl ketone, methyl isobutyl ketone, and cyclohexanone. In order for the surface modifier to show the surface-active performance more effectively, it is preferable to use water.

A method for the surface modification of the coloring agent in the present invention is described below.

To make the surface modification of the coloring agent, the coloring agent may be dispersed in the solvent by the aid of the surface modifier to introduce polymerization initiation groups into particle surface portions of the coloring agent, and a polymerizable monomer may be allowed to react with such polymerization initiation groups serving as start points, to coat the particle surfaces of the coloring agent with the resultant polymer. Such a method enables easy introduction of the polymerization initiation groups into the coloring agent even if any reactive groups are not present at the particle surfaces of the coloring agent.

Stated specifically, in the solvent in which the surface modifier has been dissolved or dispersed, the coloring agent is dispersed using the surface modifier as a dispersant. In the dispersion carried out here, a pigment dispersion machine such as a ball mill or a paint shaker may be used.

Here, where the medium is a medium in which the coloring agent is dispersible with difficulty as in the case of water, it is better to use a method as described below, which can more finely disperse the coloring agent and the coloring agent can more efficiently be surface-modified. Such a method is to disperse the coloring agent in an organic medium which is slightly soluble in water, such as toluene.

Here, like usual methods of dispersing coloring agents, it is of course possible to use the pigment dispersion machine such as a ball mill or a paint shaker.

Next, this fluid dispersion of the coloring agent is emulsified in water. Here, as an emulsifying agent, the above surface modifier is used, which has in one molecule the hydrophilic moiety and the hydrophobic moiety and the reactive moiety between them. Thus, an emulsion comprised of emulsified drops of the fluid dispersion of the coloring agent which have been coated with the surface modifier is made up. This emulsion is stirred for a while, so that the solvent slightly soluble in water, used in the fluid dispersion of the coloring agent, dissolves out slightly in water to make the emulsified drops disappear. As the result, an aqueous dispersion of the coloring agent having been dispersed by the aid of the surface modifier is prepared.

Next, into this aqueous dispersion, a polymerizable monomer constituting the resin with which the particle surfaces of the coloring agent is to be coated is introduced, optionally followed by heating, whereupon the polymerization initiation groups (reaction initiator) of the surface modifier cause the polymerizable monomer to react to coat the particle surfaces of the coloring agent with the resin. Thus, the particle surfaces of the coloring agent are modified.

As described above, in the case when the coloring agent is directly dispersed in water or other medium as described above or it is dispersed by the above method making use of an emulsifier, a commonly known surface-active agent or dispersant may auxiliarily be used in addition to the surface modifier in order to assist the dispersion of the coloring agent.

Such a surface-active agent which may be used may be, e.g., a commercially available nonionic, anionic, cationic or amphoteric surface-active agent. The anionic surface-active agent may include alkylsulfonates or alkylbenzene-sulfonates such as sodium dodecylsulfate, sodium tetradodecylsulfate, sodium pentadecylsulfate, sodium octylsulfate and sodium dodecylbenzenesulfonate; fatty acid soaps such as sodium oleate, sodium laurate, potassium stearate and calcium oleate; and other anionic surface-active agents such as sodium alkylphosphates and polycarboxylic-acid type polymeric surface-active agents.

The cationic surface-active agent may include alkyltrimethylammonium chlorides and alkyldimethylbenzylammonium chlorides.

The amphoteric surface-active agent may include alkylbetaines and amide betaines.

The nonionic surface-active agent may include polyoxyethylene alkyl ethers, polyoxyethylene alkyl aryl ethers, and sorbitan fatty esters.

As the dispersant, known dispersants may be used. As an organic-compound dispersant, usable are polyvinyl alcohol, polyvinyl methyl ether, polyvinyl ethyl ether, polyvinyl pyrrolidone, polyethylene oxide, gelatin, methyl cellulose, methylhydroxypropyl cellulose, ethyl cellulose, carobxymethyl cellulose sodium salt, and starch. As an inorganic-compound dispersant, it may include tricalcium phosphate, magnesium phosphate, aluminum phosphate, zinc phosphate, calcium metasilicate, calcium sulfate, barium sulfate, bentonite, silica and alumina.

In the present invention, it is very important that the surface modifier (surface-modifiable compound) has the reactive moiety serving as a reaction initiation group. If it is a radical reactive group such as a vinyl group, a polymerization initiator must be added for the reaction. Such a free polymerization initiator is not preferable because, e.g., when present in water, it may cause concurrence of emulsified particles. In the present invention, the reaction initiation group is present in the surface modifier. Hence, any polymerization initiator need not be added, and any difficulties as stated above by no means occur.

As the slightly water-soluble solvent, it may preferably have a solubility in water in the range of from $1 \times 10^{-6}$ to 10 because, if it is insoluble in water, the emulsified drops do not disappear. Stated specifically, it may include long-chain alcohols such as 3-pentanol, 2-methyl-1-butanol, isopentyl alcohol, tert-pentyl alcohol, 1-hexanol, 2-methyl-1-pentanol, 4-methyl-2-pentanol, 2-ethyl butanol, 1-heptanol, 2-heptanol, 3-heptanol, 2-octanol and 2-ethyl-1-hexanol; alkyl acetic esters such as ethyl acetate, butyl acetate, isobutyl acetate, isopropyl acetate and isoamyl acetate; acetic esters such as cresyl acetate, cyclohexyl acetate, phenyl acetate, naphthyl acetate and benzyl acetate; phthalic esters such as diethyl phthalate, dioctyl phthalate, didodecyl phthalate, dibutyl phthalate and dimethyl phthalate; ketones such as cyclohexanone; aliphatic or aromatic hydrocarbons such as pentane, 2-methylbutane, n-hexane, cyclohexane, 2-methylpentane, 2,2-dimethylbutane, 2,3-dimethylbutane, heptane, n-octane, isooctane, 2,2,3-trimethylpentane, decane, nonane, cyclopentane, methylcyclopentane, methylcyclohexane, ethylcyclohexane, p-menthane, bicyclohexyl, benzene, toluene, xylene and ethylbenzene; halogenated hydrocarbons such as carbon tetrachloride, chloroform, dichloromethane, dichloroethane, trichloroethane, chlorobenzene, dichlorobenzene and tetrabromoethane; and sulfur- or nitrogen-containing organic compounds such as nitropropene, nitrobenzene, dimethylformamide and dimethyl sulfoxide. Any of these compounds may be used alone or may be used in the form of a mixture.

As the reactive monomer usable in surface modification, monomers usable in the polymerization toner described later and the following compounds may be used.

As a polymerizable monomer, it may include monomers capable of initiating polymerization upon cleavage of the group at the above reactive moiety. It may specifically include, e.g., vinyl monomers. The vinyl monomers may include aromatic vinyl monomers as exemplified by styrene, alkylstyrenes such as vinyltoluene, and α-alkylstyrenes such as α-methylstyrene; α,β-unsaturated carboxylic acids as exemplified by monocarboxylic acids such as acrylic or methacrylic acid, polybasic carboxylic acids such as maleic acid, fumaric acid or itaconic acid, or acid anhydrides of these such as maleic anhydride; acrylic or methacrylic esters as exemplified by acrylic or methacrylic $C_1$ to $C_{14}$ alkyl esters such as methyl acrylate or methacrylate, ethyl acrylate or methacrylate, butyl acrylate or methacrylate, 2-ethylhexyl acrylate or methacrylate and octyl acrylate or methacrylate, hydroxyalkyl acrylate or methacrylates such as hydroxyethyl acrylate or methacrylate and hydroxypropyl acrylate or methacrylate, and glycidyl acrylate or methacrylate; acryl- or methacrylamides or derivatives thereof, as exemplified by N-methylol acryl- or methacrylamide; maleimides or derivatives thereof, as exemplified by N-methylmaleimide and N-phenylmaleimide; acrylo- or methacrylonitrile; carboxylic vinyl esters as exemplified by vinyl acetate; conjugated diene monomers as exemplified by butadiene and isoprene; olefinic monomers as exemplified by ethylene and propylene; vinyl halides as exemplified by vinyl chloride; and vinylidene halides as exemplified by vinylidene chloride.

As a cross-linkable monomer, it may include polyfunctional polymerizable monomers such as ethylene glycol diacrylate or -methacrylate, diethylene glycol diacrylate or -methacrylate, triethylene glycol diacrylate or -methacrylate, polyethylene glycol diacrylate or -methacrylate, polypropylene glycol diacrylate or -methacrylate, 1,4-butanediol diacrylate or -methacrylate, neopentyl glycol diacrylate or -methacrylate, 1,6-hexanediol diacrylate or -methacrylate, pentaerythritol diacrylate or -methacrylate, pentaerythritol triacrylate or -methacrylate, trimethylolpropane triacrylate or -methacrylate, pentaerythritol tetraacrylate or -methacrylate, divinylbenzene, and methylenebis acrylamide.

As another cross-linkable monomer, it may include monomers having a cross-linkable functional group, as exemplified by epoxy-group-containing monomers such as glycidyl acrylate or methacrylate, acrylic or methacrylic glycidyl ether, 1-allyloxy-3,4-epoxybutane, 1-(3-butenyloxy)-2,3-epoxypropane, and 4-vinyl-1-cyclohexene-1,2-epoxide; and methylol-group-containing monomers or derivatives thereof, as exemplified by N—($C_1$ to $C_{14}$)alkoxymethylacryl- or methacrylamides such as N-methylolacryl- or methacrylamide and N-methoxymethylacryl- or methacrylamide, and N-butylolacryl- or methacrylamide.

Any of these polymerizable monomers may be used alone or in combination of two or more types.

The use of any of these polymerizable monomers enables formation of tough coatings on the particle surfaces of the coloring agent to effect encapsulation. Also, the quantity of the polymerizable monomer to be used may be regulated to regulate the thickness of polymers with which the particle surfaces of the coloring agent are to be coated.

The polymerizable monomer may be used in an amount of from 0.1 to 10,000 parts by weight, preferably from 0.5 to 1,000 parts by weight, and more preferably form 1 to 100 parts by weight, based on 100 parts by weight of the coloring agent.

As black coloring agents usable in the present invention, carbon black, magnetic materials, and coloring agents toned in black by the use of yellow, magenta and cyan coloring agents shown below may be used.

The yellow coloring agent may include condensation azo compounds, isoindolinone compounds, anthraquinone compounds, azo metal complexes, methine compounds and allylamide compounds. Stated specifically, C.I. Pigment Yellow 12, 13, 14, 15, 17, 62, 74, 83, 93, 94, 95, 97, 109, 110, 111, 120, 127, 128, 129, 147, 168, 174, 176, 180, 181 and 191 are preferably used.

The magenta coloring agent may include condensation azo compounds, diketopyroropyrrole compounds, anthraquinone compounds, quinacridone compounds, basic dye chelate compounds, naphthol compounds, benzimidazolone compounds, thioindigo compounds and perylene compounds. Stated specifically, C.I. Pigment Red 2, 3, 5, 6, 7, 23, 48:2, 48:3, 48:4, 57:1, 81:1, 144, 146, 166, 169, 177, 184, 185, 202, 206, 220, 221 and 254 are particularly preferred.

The cyan coloring agent may include copper phthalocyanine compounds and derivatives thereof, anthraquinone compounds and basic dye chelate compounds. Stated specifically, C.I. Pigment Blue 1, 7, 15, 15:1, 15:2, 15:3, 15:4, 60, 62 and 66 may particularly preferably be used.

Any of these coloring agents may be used alone, in the form of a mixture, or in the state of a solid solution.

The coloring agent may preferably be added to the toner particles in an amount of from 40 to 150 parts by weight based on 100 parts by weight of the binder resin when the magnetic material is used. When other coloring agents are used, it may preferably be added in an amount of from 5 to 20 parts by weight based on 100 parts by weight of the binder resin.

The magnetic material may also be used as a coloring agent. The magnetic material may include iron oxides such as magnetite, hematite and ferrite; magnetic metals such as iron, cobalt and nickel, or alloys of any of these metals with a metal such as aluminum, cobalt, copper, lead, magnesium, tin, zinc, antimony, beryllium, bismuth, cadmium, calcium, manganese, selenium, titanium, tungsten or vanadium, and mixtures of any of these.

The magnetic material may also be used after it has previously been subjected to hydrophobic treatment with a silane coupling agent or a titanium coupling agent.

The magnetic material may preferably have an average particle diameter of 1 μm or less, and preferably from 0.1 to 0.5 μm.

The magnetic material may preferably be those having a coercive force (Hc) of from 1.6 to 24 kA/m, a saturation magnetization (σs) of from 50 to 200 $Am^2/kg$ and a residual magnetization (σr) of from 2 to 20 $Am^2/kg$, as magnetic characteristics under application of 795.8 kA/m (10 kilooersteds).

The number average particle diameter of the magnetic material may be determined in the following way: Using a magnification photograph taken on a transmission electron microscope at 40,000 magnifications, 300 particles of the magnetic material are selected at random, and their diameter is measured with a digitizer. The magnetic properties of the magnetic material are the value measured with a vibrating-sample type magnetic-force meter VSM-3S-15 (manufactured by Toei Kogyo K.K.) under an external magnetic field of 795.8 kA/m.

As a process for producing the toner particles, it may be a pulverization process in which a resin and other materials are melt-kneaded and the kneaded product is pulverized, or a polymerization process including dispersion polymerization such as suspension polymerization and emulsion polymerization, or a process in which a binder resin and other materials are dissolved or dispersed in an organic solvent and the resultant solution or fluid dispersion is suspended in an aqueous medium. Also usable is a method in which toner base particles containing at least a resin are formed by dispersion polymerization and thereafter the coloring agent is incorporated into the surface portions of the toner base particles by a dry process or a wet process.

As a method of incorporating the coloring agent later, it may include a method in which the coloring agent is mechanically fixed to the toner base particles by a dry process, or the toner base particles and the coloring agent are dispersed by a wet process to fix the latter to the former by utilizing agglomeration attributable to zeta potential and utilizing mechanical shear; and a method in which, in addition to the above operation, the atmosphere is heated from about the glass transition temperature (Tg) of the binder resin to a temperature higher than that to improve the efficiency of the mechanical shear.

As another method of incorporating the coloring agent later, a method as described below is also effective. First, the coloring agent is dispersed in an organic solvent such as toluene to prepare a fluid dispersion. Next, this fluid dispersion is emulsified in water to prepare an emulsion, and an aqueous dispersion of toner base particles comprised of at least the binder resin, having been prepared separately from the emulsion, is mixed so that the fluid dispersion of the coloring agent swells, and is absorbed into, the toner base particles to incorporate the coloring agent into the toner particles. Thereafter, the organic solvent such as toluene may be removed by heating or bringing the system into a vacuum condition, or putting the toner particles into a water-miscible solvent such as alcohol, which does not dissolve the resin but dissolves the organic solvent. Where the coloring agent is incorporated into the toner particles in this way, the coloring agent tends relatively to come bare to the surfaces of toner particles. However, the use of the surface-modified coloring agent of the present invention enables achievement of sufficient charge quantity even where the coloring agent stands bare to the surfaces of toner particles.

As the solvent usable in the method in which the emulsion of the fluid dispersion of coloring agent in the organic solvent is made to swell, and be absorbed into, the toner particles, it may preferably be capable of dissolving the binder resin of the toner particles and be only slightly soluble in the water. It may preferably be selected in accordance with the resin component contained in the toner particles. Stated specifically, it may include long-chain alcohols such as 3-pentanol, 2-methyl-1-butanol, isopentyl alcohol, tert-pentyl alcohol, 1-hexanol, 2-methyl-1-pentanol, 4-methyl-2-pentanol, 2-ethyl butanol, 1-heptanol, 2-heptanol, 3-heptanol, 2-octanol and 2-ethyl-1-hexanol; alkyl acetic esters such as ethyl acetate, butyl acetate, isobutyl acetate, isopropyl acetate and isoamyl acetate; acetic esters such as cresyl acetate, cyclohexyl acetate, phenyl acetate, naphthyl acetate and benzyl acetate; phthalic esters such as diethyl phthalate, dioctyl phthalate, didodecyl phthalate, dibutyl phthalate and dimethyl phthalate; ketones such as cyclohexanone; aliphatic or aromatic hydrocarbons such as pentane, 2-methylbutane, n-hexane, cyclohexane, 2-methylpentane, 2,2-dimethylbutane, 2,3-dimethylbutane, heptane, n-octane, isooctane, 2,2,3-trimethylpentane, decane, nonane, cyclopentane, methylcyclopentane, methylcyclohexane, ethylcyclohexane, p-menthane, bicyclohexyl, benzene, toluene, xylene and ethylbenzene; halogenated hydrocarbons such as carbon tetrachloride, chloroform, dichloromethane, dichloroethane, trichloroethane, chlorobenzene, dichlorobenzene and tetrabromoethane; and sulfur- or nitrogen-containing organic compounds such as nitropropene, nitrobenzene, dimethylformamide and dimethyl sulfoxide. Any of these solvents may be used alone or may be used in the form of a mixture.

As the water-miscible solvent such as alcohol, which does not dissolve the resin but dissolves the organic solvent, it may appropriately be selected from organic solvents capable of dissolving binder resins and coloring agents of toner particles. Alcohols such as methanol and ethanol are preferred.

As the binder resin for the toner in the present invention, it may include polystyrene; homopolymers of styrene derivatives such as poly-p-chlorostyrene and polyvinyltoluene; styrene copolymers such as a styrene-p-chlorostyrene copolymer, a styrene-vinyltoluene copolymer, a styrene-vinylnaphthalene copolymer, a styrene-acrylate copolymer, a styrene-methacrylate copolymer, a styrene-methyl α-chloromethacrylate copolymer, a styrene-acrylonitrile copolymer, a styrene-methyl vinyl ether copolymer, a styrene-ethyl vinyl ether copolymer, a styrene-methyl vinyl ketone copolymer, a styrene-butadiene copolymer, a styrene-isoprene copolymer and a styrene-acrylonitrile-indene copolymer; polyvinyl chloride, phenol resins, natural resin modified phenol resins, natural resin modified maleic acid resins, acrylic resins, methacrylic resins, polyvinyl acetate, silicone resins, polyester resins, polyurethane resins, polyamide resins, furan resins, epoxy resins, xylene resins, polyvinyl butyral, terpene resins, cumarone indene resins, and petroleum resins.

Cross-linked styrene copolymers and cross-linked polyester resins are preferred binder resins.

As the polymerizable monomer used when the toner particles are produced by polymerization, it may include styrene; monocarboxylic acids having a double bond and derivatives thereof as exemplified by acrylic acid, methyl acrylate, ethyl acrylate, butyl acrylate, dodecyl acrylate, octyl acrylate, 2-ethylhexyl acrylate, phenyl acrylate, methacrylic acid, methyl methacrylate, ethyl methacrylate, butyl methacrylate, octyl methacrylate, acrylonitrile, methacrylonitrile and acrylamide; dicarboxylic acids having a double bond and derivatives thereof as exemplified by maleic acid, butyl maleate, methyl maleate and dimethyl maleate; vinyl esters as exemplified by vinyl chloride, vinyl acetate and vinyl benzoate; ethylenic olefins as exemplified by ethylene, propylene and butylene; vinyl ketones as exemplified by methyl vinyl ketone and hexyl vinyl ketone; and vinyl ethers as exemplified by methyl vinyl ether, ethyl vinyl ether and isobutyl vinyl ether. Any of these vinyl monomers may be used alone or in combination of two or more types. Copolymers of styrene with vinyl monomers other than styrene are preferred.

As a cross-linking agent therefor, compounds having at least two polymerizable double bonds may be used. For example, they may include aromatic divinyl compounds such as divinyl benzene and divinyl naphthalene; carboxylic esters having two double bonds, such as ethylene glycol diacrylate, ethylene glycol dimethacrylate and 1,3-butanediol dimethacrylate; divinyl compounds such as divinyl aniline, divinyl ether, divinyl sulfide and divinyl sulfone; and compounds having at least three vinyl groups. Any of these may be used alone or in the form of a mixture.

In the case when the binder resin is a styrene-acrylate copolymer, preferred is a binder resin such that, in its molecular weight distribution as measured by gel permeation chromatography (GPC) of THF-soluble matter, at least one peak is present in the region of molecular weight of from 3,000 to 50,000 and a component having a molecular weight of 100,000 or less comprises from 50% to 90%.

In the present invention, the molecular weight measured by GPC of THF(tetrahydrofuran)-soluble matter of the binder resin, using THF as solvent, is measured under the following conditions. Molecular weights of 1,000 or more are measured.

Columns are stabilized in a heat chamber of 40° C. To the columns kept at this temperature, THF (tetrahydrofuran) as a solvent is flowed at a flow rate of 1 ml per minute. From 50 to 200 μl of a THF sample solution of resin which has been regulated to have a sample concentration of form 0.05 to 0.6% by weight is injected thereinto to make measurement. In measuring the molecular weight of the sample, the molecular weight distribution ascribed to the sample is calculated from the relationship between the logarithmic value and count number of a calibration curve prepared using several kinds of monodisperse polystyrene standard samples. As the standard polystyrene samples used for the preparation of the calibration curve, it is suitable to use samples with molecular weights of 600, 2,100, 4,000, 17,500, 51,000, 110,000, 390,000, 860,000, 2,000,000 and 4,480,000, which are available from Pressure Chemical Co. or Toso Co., Ltd., and to use at least about 10 standard polystyrene samples. An RI (refractive index) detector is used as a detector.

As columns, in order to make precise measurement in the region of molecular weight from 1,000 to 2,000,000, it is desirable to use a plurality of commercially available polystyrene gel columns in combination. For example, they may preferably comprise a combination of μ-STYRAGEL 500, 1,000, 10,000 and 100,000, available from Waters Co.; a combination of SHODEX KF-80M, KF-801, KF-803, KF-804 and KA-805 or a combination of SHODEX KA-802, KA-803, KA-804 and KA-805, available from Showa Denko K.K.; or a combination of TSKgel G1000H, G2000H, G2500H, G3000H, G4000H, G5000H, G6000H, G7000H and GMH, available from Toso Co., Ltd.

As a specific method for the measurement by GPC, a solution prepared by dissolving 100 mg of the toner in 20 ml of tetrahydrofuran at room temperature over a period of 24 hours is filtered with a solvent-resistant membrane filter of 0.2 μm in pore diameter to obtain the sample solution.

As to the percent by weight based on the weight of the binder resin with a molecular weight of 1,000 or less, a chromatogram obtained by GPC is cut out at its part with a molecular weight of 10,000 or less, and its ratio of molecular weight to a cutout at the part with a molecular weight of more than 10,000 is calculated. Using the percent by weight of THF-insoluble matter, the percent by weight based on the weight of the whole binder resin is calculated.

As the binder resin, a polyester resin shown below is also preferred. In the polyester resin, from 45 to 55 mol % in the all components are held by an alcohol component, and from 55 to 45 mol % by an acid component.

As the alcohol component, it may include polyhydric alcohols such as ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, hydrogenated bisphenol A, a bisphenol derivative represented by the following Formula (A), a diol represented by the following Formula (B), glycerol, sorbitol and sorbitan.

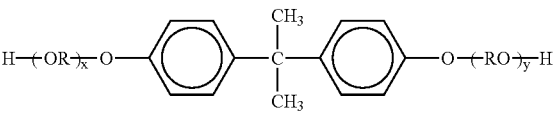

(A)

wherein R represents an ethylene group or a propylene group, x and y are each an integer of 1 or more, and an average value of x+y is 2 to 10.

(B)

wherein R' represents —CH$_2$—CH$_2$—,

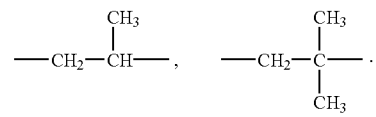

As a dibasic carboxylic acid component that holds 50 mol % or more of the whole acid component, it may include benzenedicarboxylic acids and anhydrides thereof, such as phthalic acid, terephthalic acid, isophthalic acid and phthalic anhydride; alkyldicarboxylic acids such as succinic acid, adipic acid, sebacic acid and azelaic acid, and anhydrides thereof, as well as succinic acid substituted with an alkyl group or alkenyl group having 6 to 18 carbon atoms, or anhydrides thereof; unsaturated dicarboxylic acids such as fumaric acid, maleic acid, citraconic acid and itaconic acid, and anhydrides thereof. As a tribasic or higher carboxylic acid, it may include trimellitic acid, pyromellitic acid, benzophenonetetracarboxylic acid, and anhydrides thereof.

The polyester resin may preferably have an acid value of 90 mg·KOH/g or less, and more preferably 50 mg·KOH/g or less, and may preferably have an OH value (hydroxyl value) of 50 mg·KOH/g or less, and more preferably 30 mg·KOH/g or less. This is because a polyester resin having a large number of terminal groups of the molecular chain may make the fixing performance of toner have a low environmental stability.

The acid value of the polyester resin is measured by the following measuring method.

The acid value (or acid number) is defined to be the number of milligrams of potassium hydroxide required for the neutralization of carboxyl groups present in 1 g of resin. It is measured in the following way.

In a 200 to 300 ml Erlenmeyer flask, 2 to 10 g of a sample is weighed and put, followed by addition of about 50 ml of a 30:70 mixed solvent of methanol and toluene to dissolve polyester resin. If it can not well be dissolved, acetone may be added in a small quantity. Using a 0.1% by weight mixed reagent of Bromothymol Blue and Phenol Red, titration is made in 0.1N potassium hydroxide-alcohol solution previously standardized, and the acid value is calculated from the consumption of the potassium hydroxide-alcohol solution according the following calculation.

Acid value=KOH (ml number)×$N$×56.1/sample weight wherein N represents a factor of 0.1N KOH.

In the case when the polyester resin is used as the binder resin, it may preferably have a number-average molecular weight (Mn) of from 3,000 to 100,000 and a weight-average molecular weight (Mw) of from 5,000 to 500,000.

The binder resin may preferably have a glass transition point of from 0° C. to 150° C., and more preferably from 30° C. to 100° C.

The glass transition point (Tg) is measured by the following measuring method.

Measured according to ASTM D3418-82, using a differential thermal analyzer (DSC measuring instrument) DSC-7, manufactured by Perkin-Elmer Corporation.

A sample for measurement is precisely weighed in an amount of from 5 mg to 20 mg, preferably 10 mg. This sample is put in a pan made of aluminum and an empty aluminum pan is used as reference. Measurement is made in a normal-temperature normal-humidity environment at a heating rate of 10° C./min within the measuring temperature range of from 30° C. to 200° C. In the course of this heating, main-peak endothermic peaks in the temperature range of from 40° C. to 100° C. are obtained.

The point at which the line at a middle point of the base line before and after the appearance of the endothermic peak thus obtained and the differential thermal curve intersect is regarded as the glass transition point (Tg).

The toner of the present invention, obtained as described above, may have particle diameters within the range of, but not particularly limited to, from 0.1 μm to 10 μm in order for the toner to have a high fluidity.

To the toner of the present invention, a charge control agent may optionally be added. When it is added, any conventionally known charge control agent may be used. Inorganic fine particles such as silica, titanium or aluminum particles or organic fine particles may further be used as an external additive in order to regulate the charge quantity of toner particles.

Specific construction of the toner of the present invention and process for its production is described below by giving Examples. Note that the present invention is by no means limited by the following Examples.

Surface Modifier

SYNTHESIS EXAMPLE 1

5.6 mg of a polymerization initiator 4,4'-azobis(4-cyanovaleric acid) (V-501, available from Wako Pure Chemical Industries, Ltd.) was dissolved in 50 ml of THF. To the solution formed, 4.6 g of N-hydroxysuccinimide and 8.24 g of N,N'-dicyclohexylcarbodimide were added, followed by stirring at room temperature for 24 hours. Thereafter, the THF was evaporated off, and the residue formed was dispersed in 500 ml of acetone to remove a precipitate. The acetone was evaporated off to obtain crystals of 4,4'-azobis (4-cyanovaleric acid).

Next, 1.76 g of the above crystals were dissolved in 35 ml of DMF (dimethylformamide). To the solution formed, 0.74 g of dodecylamine was added, followed by stirring overnight. The reaction mixture formed was introduced into 300 ml of water, and the precipitate having separated out was filtered and washed with water, and thereafter again dissolved in dimethoxyethane, followed by drying with magnesium sulfate. Thereafter, the solvent was evaporated off, and the residue was washed with ethyl acetate and dried to obtain a product in which one ester of the diester was substituted with dodecylamine.

Subsequently, 1.7 g of a dried matter of the product was dispersed in 20 ml of methanol. To the dispersion formed, 1.6 ml of an aqueous 2 mols/liter NaOH solution was added, and the mixture formed was stirred at room temperature. The ester having remained was hydrolyzed to obtain the following compound 1.

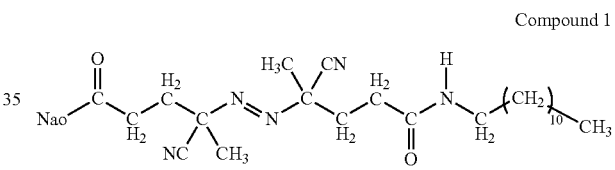

Compound 1

Surface Modifier

SYNTHESIS EXAMPLE 2

2.72 g of the product in which one ester of the diester was substituted with dodecylamine was dispersed in 40 ml of methanol. To the dispersion formed, 0.87 g of sulfanilic acid was added, and the mixture formed was stirred overnight. Then, 0.03 ml of an aqueous 0.5 mol/liter NaOH solution was added to obtain the following compound 2.

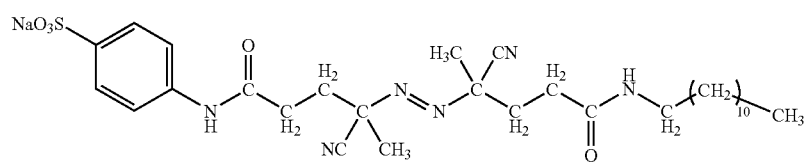

Compound 2

Surface Modifier

SYNTHESIS EXAMPLE 3

The following compound 3 was obtained in the same manner as in Surface Modifier Synthesis Example 1 except that 0.41 g of n-hexylamine was used in place of 0.74 g of the dodecylamine.

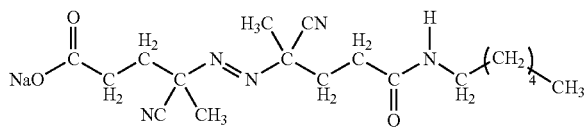

Compound 3

Surface Modifier

SYNTHESIS EXAMPLE 4

The following compound 4 was obtained in the same manner as in Surface Modifier Synthesis Example 2 except that 1.08 g of stearylamine was used in place of 0.74 g of the dodecylamine.

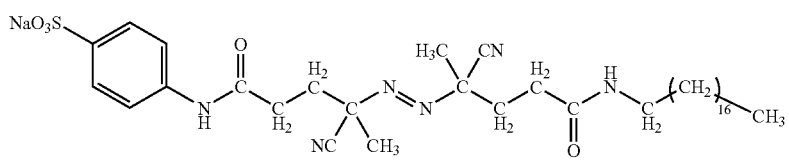

Compound 4

SYNTHESIS EXAMPLE 5

The following compound 5 was obtained in the same manner as in Surface Modifier Synthesis Example 1 except that 1.41 g of tetracosylamine was used in place of 0.74 g of the dodecylamine.

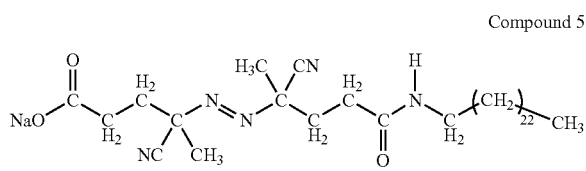

Compound 5

SYNTHESIS EXAMPLE 6

The following compound 6 was obtained in the same manner as in Surface Modifier Synthesis Example 2 except that 0.63 g of decylamine was used in place of 0.74 g of the dodecylamine and 0.63 g of 2-aminoethanesulfonic acid was used in place of 0.87 g of the sulfanilic acid.

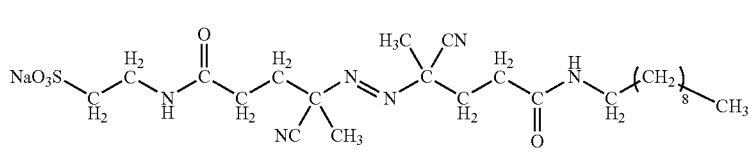

Compound 6

EXAMPLE 1

Surface Modification of Coloring Agent:

In 300 parts by weight of toluene, 30 parts by weight of a yellow pigment (C.I. Pigment Yellow 17) was thoroughly dispersed by means of a ball mill to prepare a pigment dispersion. In an aqueous solution prepared by dissolving in 30,000 parts by weight of ion-exchanged water 6 parts by weight of sodium dodecylbenzenesulfonate and 60 parts by weight of the surface modifier (Compound 1) synthesized in Surface Modifier Synthesis Example 1, the above pigment dispersion was dispersed by means of an ultrasonic homogenizer to prepare an emulsion of the pigment dispersion. Next, this emulsion was stirred to form an aqueous dispersion, and 2,100 parts by weight of styrene was added to the aqueous dispersion formed, to effect polymerization at 70° C. for 17 hours. The resultant reaction mixture was repeatedly filtered and washed with water to obtain a surface-modified yellow pigment. This yellow pigment was observed by SEM (scanning electron microscopy) to find that spherical particles of from 40 nm to 170 nm in diameter were observable and it was ascertained that the yellow pigment particles were coated with a styrene polymer in a coating weight of about 5% by weight.

| Production of toner: | (by weight) |
|---|---|
| Polyester resin obtained by condensation of propoxylated bisphenol with fumaric acid | 100 parts |
| Chromium complex of di-tert-butylsalicylic acid | 2 parts |
| The above surface-modified yellow pigment (C.I. Pigment Yellow 17) | 5 parts |

The above materials were premixed by means of a high-speed HENSCHEL mixer. Thereafter, the mixture formed was passed through a three-roll mill set to a temperature of 150° C., to carry out melt kneading.

Next, the resultant kneaded composition was crushed into particles of 2 mm in diameter by means of a speed mill, and 532 parts by weight and 22 parts by weight of the same polyester resin and chromium-containing complex, respectively, were further added to the composition, which were then melt-kneaded by means of a twin-screw extruder. The resultant final kneaded product was pulverized, followed by classification to obtain yellow toner particles with a volume-average particle diameter of 8.0 μm. To 100 parts by weight of the yellow toner particles thus obtained, 2 parts by weight of hydrophobic fine titanium oxide particles were externally added to prepare a yellow toner.

This yellow toner and a coated ferrite carrier having an average particle diameter of 45 μm, coated with a styrene-acrylate resin, were blended to prepare a developer having a toner concentration of 5%. Charge quantity (triboelectric charge quantity) of this developer was measured to find that it was −25.6 μC/g.

In the present invention, the charge quantity is measured in the following way: 10 g of the above developer is put into a polyethylene bottle, which is then shaken for 6 minutes using a YAYOI shaker to charge the developer triboelectrically. This developer is set in a blow-off powder charge quantity measuring instrument (TB-200, manufactured by Toshiba Chemical Co., Ltd.), using a sieve with a mesh of 20 μm (625 meshes) and $N_2$ as blowing gas, to make measurement at a pressure of 98 kPa (1 kg/cm$^2$). The value measured after 30 seconds is regarded as the charge quantity of the toner particles or toner.

To evaluate the OHP (overhead projector) transparency of this toner, an experiment was made in the following way: This developer was put in a copying machine CLC1100, manufactured by CANON INC., from which a fixing assembly was detached, and solid-image development was made on an overhead projector transparent sheet (OHT) COLOR LASER COPYER TRANSPARENCY, CT-700, manufactured by CANON INC. Thereafter, this OHT with a toner image formed thereon was placed for 10 seconds in a dryer set to 180° C., to fix the toner image.

The OHT after fixing was cut in an appropriate size, and its transmittance at 214 nm to 600 nm was measured with a spectrophotometer Model U-3300, manufactured by Hitachi Ltd., using a virgin OHT as a reference. The integral area of the spectrum obtained was calculated, and the total transmittance of the OHT image in the above wavelength range was calculated. Also, a case in which the transmittance was all 100% in this wavelength range was regarded as 100, where the value of total transmittance of the sample was calculated according the following expression to evaluate the transmittance. The greater this value is, the larger the amount of transmitted light having passed the sample is, showing that its transmittance is higher.

Sample transmittance=[(transmittance integral area value)/{(measurement end wavelength)−(measurement start wavelength)}×100]×100(%)

The integral area of transmittance of this yellow toner was found to be 38,168%. The transmittance integral area in the case in which the transmittance is all 100% in the wavelength range of from 214 nm to 600 nm can be calculated to be (600−214)×100%= 38,600%. Regarding this value as 100%, the transmittance of the toner of this Example on the OHT was calculated to find that it was 98.9%. The image projected on a screen with use of an OHP was also clear.

Using this developer, images were reproduced by a color laser copying machine CLC1130, manufactured by CANON INC., to find that fixed images having clear yellow color were obtained.

EXAMPLE 2

Surface Modification of Coloring Agent:

A pigment was surface-modified in the same manner as in Example 1 except that the yellow pigment was changed to a quinacridone pigment (C.I. Pigment Red 122). This pigment was observed by SEM to find that spherical particles of from 40 to 170 nm in diameter were observable and it was ascertained that the quinacridone pigment particles were coated with a styrene polymer in a coating weight of about 5% by weight.

Production of Toner:

Into a four-necked flask having a high-speed stirrer TK HOMOMIXER, 910 parts by weight of ion-exchanged water and 100 parts by weight of polyvinyl alcohol were introduced, followed by heating to 55° C. with stirring at a number of revolutions of 1,200 rpm to obtain an aqueous dispersion medium.

| Composition of monomer dispersion | (by weight) |
|---|---|
| Styrene monomer | 90 parts |
| n-Butyl acrylate monomer | 30 parts |
| The above surface-modified quinacridone pigment | 6 parts |
| Chromium complex of di-tert-butylsalicylic acid | 2 parts |

Meanwhile, the above materials were dispersed for 3 hours by means of an attritor. Thereafter, 3 parts by weight of a polymerization initiator 2,2'-azobis(2,4-dimethylvaleronitrile) was added to prepare a monomer dispersion.

Next, the monomer dispersion thus prepared was introduced into the dispersion medium held in the above four-necked flask to effect granulation for 10 minutes while maintaining the above number of revolutions. Subsequently, with stirring at 50 rpm, polymerization was carried out at 55° C. for 1 hour, and then at 65° C. for 4 hours, and further at 80° C. for 5 hours. After the polymerization was completed, the slurry formed was cooled, which was then repeatedly washed with purified water to remove the dispersant, further followed by washing and drying to obtain magenta toner particles with a volume-average particle diameter of 6.5 μm. To 100 parts by weight of the magenta toner particles thus obtained, 2 parts by weight of hydrophobic fine titanium oxide particles were externally added to prepare a magenta toner.

This magenta toner and a coated ferrite carrier having an average particle diameter of 45 μm, coated with a styrene-acrylate resin, were blended to prepare a developer having a toner concentration of 5%. Charge quantity of this developer was measured in the same manner as in Example 1 to find that it was −26.4 μC/g.

An OHT having a fixed image thereon was also prepared in the same manner as in Example 1, and the integral area of transmittance at 304 nm to 874 nm was determined to find that it was 33,981%. The transmittance integral area in the case in which the transmittance was all 100% in this wavelength range came to be (874−304)×100%=57,000%, and therefore the transmittance of the OHT image of this toner came to be 59.6%. The image projected on a screen with use of an OHP was clear.

Using this developer, images were reproduced by a color laser copying machine CLC1130, manufactured by CANON INC., to find that fixed images having clear magenta color were obtained.

EXAMPLE 3

Surface Modification of Coloring Agent:

A surface-modified pigment was prepared in the same manner as in Example 1 except that the yellow pigment was changed to a phthalocyanine pigment. The pigment obtained was observed by SEM to find that spherical particles of from 40 to 150 nm in diameter were observable and it was ascertained that the phthalocyanine pigment particles were coated with a styrene polymer in a coating weight of about 5% by weight.

Production of Toner:

Into a four-necked flask having a reflux condenser, a thermometer and a nitrogen feed pipe, the following materials were introduced and were thoroughly mixed.

|  | (by weight) |
| --- | --- |
| Methanol (b.p.: 64.1° C.) | 93 parts |
| Polymethyl vinyl ether | 7 parts |
| Styrene monomer | 28 parts |
| n-Butyl acrylate | 7 parts |
| The above surface-modified phthalocyanine pigment | 2 parts |
| Chromium complex of di-tert-butylsalicylic acid | 1 part |
| 2,2'-azobisisobutyronitrile | 2 parts |

At this stage, dissolved oxygen in the reaction medium was in an amount of 7.0 mg/liter. Then, nitrogen gas was fed into this mixture. The nitrogen gas was fed at a flow rate of 250 ml/min. to effect displacement with nitrogen for 30 minute. At this stage, dissolved oxygen in the reaction medium was in an amount of 0.92 mg/liter. Thereafter, the feed rate of the nitrogen gas was controlled to 50 ml/min., and this mixture was heated from room temperature to 62° C. at an average heating rate of 3.0° C./min. to carry out polymerization reaction at that temperature for 16 hours. After the polymerization reaction was completed, the reaction mixture obtained was repeatedly filtered with methanol to wash the polymeric matrix polymethyl vinyl ether. Thereafter, the cyan toner particles thus obtained were further vacuum-dried to obtain cyan toner particles with a volume-average particle diameter of 4.8 μm. To 100 parts by weight of the cyan toner particles obtained, 2 parts by weight of hydrophobic fine titanium oxide particles were externally added to prepare a cyan toner.

Using this cyan toner, a developer was prepared in the same manner as in Example 1. Charge quantity of this developer was measured in the same way to find that it was −25.1 μC/g.

An OHT having a fixed image thereon was also prepared in the same manner as in Example 1, and the integral area of transmittance at 288 nm to 866 nm was determined to find that it was 34,080%. The transmittance integral area in the case in which the transmittance was all 100% in this wavelength range came to be (866−288)×100%=57,800%, and therefore the transmittance of the OHT image of this toner came to be 59.0%. The image projected on a screen with use of an OHP was clear.

Using this developer, images were reproduced by a color laser copying machine CLC1130, manufactured by CANON INC., to find that fixed images having clear cyan color were obtained.

EXAMPLE 4

Surface Modification of Coloring Agent:

A pigment was surface-modified in the same manner as the surface modification in Example 1 except that the yellow pigment was changed to carbon black, the surface modifier to the one synthesized in Synthesis Example 2, and also the amount of this surface modifier to 100 parts by weight. After the treatment, this pigment was observed by SEM to find that the carbon black was in the form of spherical particles of from 30 to 100 nm in diameter and it was ascertained that the pigment particles were coated with a styrene polymer in a coating weight of about 5% by weight.

Production of Toner:

Colorless resin particles were produced in the same manner as the production of toner in Example 3 except that the cyan pigment was not used. Then, 100 parts by weight of the resin particles thus obtained and 20 parts by weight of the carbon black having been treated with the above method of surface modification were put into a hybridizer manufactured by Nara Kikai K.K., to cause the carbon black to fix to the resin particle surfaces. Thus, black toner particles were obtained. The black toner particles had a volume-average particle diameter of 6.0 μm. To 100 parts by weight of the black toner particles thus obtained, 2 parts by weight of hydrophobic fine titanium oxide particles were externally added to prepare a black toner.

Using this black toner, a developer was prepared in the same manner as in Example 1. Charge quantity of this developer was measured in the same way to find that it was −25.3 μC/g. Also, in order to evaluate the dispersibility of pigment in the black toner, halftone images were reproduced and their uniformity was visually evaluated to find that uniform fixed images free of any coarse images were obtained.

Using this developer, images were reproduced by a color laser copying machine CLC1130, manufactured by CANON INC., to find that good images were obtained.

EXAMPLE 5

Surface Modification of Coloring Agent:

A magnetic iron oxide was surface-treated in the same manner as the surface modification in Example 1 except that the yellow pigment was changed to 80 parts by weight of magnetic iron oxide [number-average particle diameter: 0.18 μm; Hc: 9.6 kA/m (121 oersteds); σs: 83 $Am^2$/kg; σr: 11 $Am^2$/kg, under application of 795.8 kA/m (10 kilo-oersteds)] used as a coloring agent. The resultant magnetic iron oxide was observed by SEM to find that it was in the form of spherical particles and it was ascertained that the particles were coated with a styrene polymer.

Production of Toner:

100 parts by weight of the resin particles produced in Example 4 and 400 parts by weight of water were put into a beaker, and were dispersed with stirring by means of an ultrasonic homogenizer. Meanwhile, 95 parts by weight of the magnetic iron oxide having been treated as described above was put into a 50/50 mixed solvent of water and methanol, and were dispersed in the same way.

The above dispersion of resin particles and dispersion of magnetic iron oxide were mixed, and were again dispersed with stirring by means of the ultrasonic homogenizer. Next, the resultant dispersion mixture was stirred at 80° C., at 3,000 rpm and for 15 minutes by means of a sand mill making use of glass beads of 1 mm in diameter to cause the magnetic iron oxide to fix to the resin particle surfaces. Thus, magnetic toner particles were obtained. The magnetic toner particles had a volume-average particle diameter of 6.3 μm. To 100 parts by weight of the magnetic toner particles thus obtained, 2 parts by weight of hydrophobic fine silica particles were externally added to prepare a magnetic toner.

This magnetic toner was blended with a carrier in the same manner as in Example 1 to prepared a developer. Charge quantity of this developer was measured in the same way to find that it was −20.14 μC/g. Also, this magnetic toner was set in a digital copying machine GP215, manufactured by CANON INC., and, in order to evaluate the dispersibility of the toner, halftone images were reproduced and their uniformity was visually evaluated to find that uniform fixed images free of any coarse images were obtained.

Using the above developer, images were reproduced by GP215 to find that good images were obtained.

EXAMPLE 6

Surface Modification of Coloring Agent:

In 300 parts by weight of toluene, 30 parts by weight of carbon black was thoroughly dispersed by means of a ball mill to prepare a pigment dispersion. In an aqueous solution prepared by dissolving in 30,000 parts by weight of ion-exchanged water 6 parts by weight of sodium dodecylbenzenesulfonate and 120 parts by weight of the surface modifier (Compound 2), the above pigment dispersion was dispersed by means of an ultrasonic homogenizer to prepare an emulsion of the pigment dispersion. Next, this emulsion was stirred to form an aqueous dispersion, and 1,950 parts by weight of styrene and 210 parts by weight of divinylbenzene were added to the aqueous dispersion formed, to effect polymerization at 70° C. for 17 hours. The resultant reaction mixture was repeatedly filtered and washed with water to obtain a surface-modified carbon black pigment. This pigment was observed by SEM to find that spherical particles of from 40 nm to 170 nm in diameter were observable and it was ascertained that the pigment particles were coated with a styrene polymer in a coating weight of about 5% by weight.

Production of Toner:

30 parts by weight of the surface-modified carbon black obtained as described above was introduced into 100 parts by weight of toluene to disperse the former in the latter to prepare a carbon black dispersion. Next, this carbon black dispersion was introduced into 300 parts by weight of an aqueous solution of 0.25% of sodium dodecylbenzenesulfonate to effect emulsification by means of an ultrasonic homogenizer. Into the resultant dispersion, a dispersion was introduced which was prepared by dispersing 100 parts by weight of the resin particles prepared in Example 3, in 500 parts by weight of an aqueous solution of 0.25% of sodium dodecylbenzenesulfonate, followed by stirring overnight at room temperature to cause the carbon black to become absorbed in the resin particles. Next, the resultant dispersion was introduced into 2,000 parts by weight of methanol and the toluene was removed from the resin particles, followed by filtration and washing with water repeatedly, to obtain black toner particles. The black toner particles thus obtained had a particle diameter of 5.9 μm. The black toner particles had a volume-average particle diameter of 6.3 μm. To 100 parts by weight of the black toner particles thus obtained, 2 parts by weight of hydrophobic fine titanium oxide particles were externally added to prepare a black toner.

This black toner was blended with a carrier in the same manner as in Example 1 to prepared a developer. Charge quantity of this developer was measured in the same way to find that it was −24.8 μC/g. Also, this black toner was set in a color laser beam copying machine CLC1130, manufactured by CANON INC., and, in order to evaluate the dispersibility of pigment in the black toner, halftone images were reproduced and their uniformity was visually evaluated to find that uniform fixed images free of any coarse images were obtained.

Using the above developer, images were reproduced by CLC1130 to find that good images were obtained.

EXAMPLE 7

A quinacridone pigment was surface-modified, and then a toner was produced, in the same manner as in Example 2 except that the surface modifier used therein was changed to the compound 3, synthesized in Synthesis Example 3, and the amount of the sodium dodecylbenzenesulfonate to be dissolved in the ion-exchanged water was changed to 50 parts by weight. This toner was blended with a carrier in the same manner as in Example 1 to prepared a developer, and charge quantity of this developer was measured in the same way to find that it was −26.1 μC/g. Also, a fixed image was formed on an OHT in the same manner as in Example 1, and the integral area of transmittance at 302 nm to 846 nm was determined to find that it was 33,974%, showing good transmittance. Fixed images obtained in the same way were also good.

EXAMPLE 8

A quinacridone pigment was surface-modified, and then a toner was produced, in the same manner as in Example 7 except that the compound 4, synthesized in Synthesis Example 4, was used in place of the surface modifier used in Example 7. Charge quantity was measured in the same manner as in Example 1 to find that it was −26.3 μC/g. The transparency on OHT was also evaluated in the same manner as in Example 2 to find that the integral area of transmittance was 33,990%, showing good transmittance. Fixed images obtained in the same way were also good.

EXAMPLE 9

A quinacridone pigment was surface-modified, and then a toner was produced, in the same manner as in Example 7 except that the compound 5, synthesized in Synthesis Example 5, was used in place of the surface modifier used in Example 7. Charge quantity was measured in the same manner as in Example 1 to find that it was −25.9 μC/g. The transparency on OHT was also evaluated in the same manner as in Example 2 to find that the integral area of transmittance was 33,897%, showing good transmittance. Fixed images obtained in the same way were also good.

EXAMPLE 10

A quinacridone pigment was surface-modified, and then a toner was produced, in the same manner as in Example 7 except that the compound 6, synthesized in Synthesis Example 6, was used in place of the surface modifier used in Example 7. Charge quantity was measured in the same manner as in Example 1 to find that it was −26.2 μC/g. The transparency on OHT was also evaluated in the same manner as in Example 2 to find that the integral area of transmittance was 33,969%, showing good transmittance. Fixed images obtained in the same way were also good.

COMPARATIVE EXAMPLES 1 to 6

Toners of Comparative Examples were prepared in the same manner as the preparation of the toners of Examples 1 to 6 except that the coloring agents used therein were not surface-modified. The OHT transmittance and charge quantity of each toner are shown in Table 1 below. All toners of Comparative Examples had no problem in practical use. However, as shown in Table 1, it proved that some of them showed a lower transmittance than those of Examples because of a lower dispersibility of the coloring agent and that the charge quantity came a little lower because the coloring agent stood bare to particle surfaces.

OHT images formed by the color toners of Comparative Examples 1 to 3 and projected on a screen with use of an OHP were seen a little dark.

TABLE 1

|  | OHT transmittance (integral area) (%) | Halftone coarse image | Charge quantity (μC/g) |
|---|---|---|---|
| Example 1 | 38,168 | — | −25.6 |
| Comp. Ex. 1 | 38,023 | — | −25.3 |
| Example 2 | 33,981 | — | −26.4 |
| Comp. Ex. 2 | 33,794 | — | −26.1 |

TABLE 1-continued

|  | OHT transmittance (integral area) (%) | Halftone coarse image | Charge quantity (µC/g) |
|---|---|---|---|
| Example 3 | 34,080 | — | −25.1 |
| Comp. Ex. 3 | 33,951 | — | −20.1 |
| Example 4 | — | A | −25.3 |
| Comp. Ex. 4 | — | C | −19.4 |
| Example 5 | — | B | −20.14 |
| Comp. Ex. 5 | — | C | −19.1 |
| Example 6 | — | B | −24.8 |
| Comp. Ex. 6 | — | C | −18.9 |

Evaluation criteria:
A: Fine-line reproducibility is good, and halftone areas (highlight areas) of photographic images are faithfully reproduced.
B: A little inferior in smoothness, but on a level of practical use.
C: Inferior in smoothness, and coarse images are conspicuous.

COMPARATIVE EXAMPLE 7

In a solution of mixture of 90 parts by weight of styrene and 30 parts by weight of n-butyl acrylate, 2.4 parts by weight of stearyl peroxide were dissolved, and 6.6 parts by weight of a quinacridone pigment (C.I. Pigment Red 122) were further added thereto, followed by stirring. With further stirring, the mixture formed was heated at 40° C. for 4 hours. To the resultant slurry, 3 parts by weight of 2,2′-azobis(2,4-dimethylvaleronitrile) and 2 parts by weight of a chromium complex of di-tert-butylsalicylic acid were added, and the subsequent procedure of Example 2 was repeated to obtain magenta toner particles. The magenta toner particles thus obtained had a volume-average particle diameter of 8.5 µm.

To 100 parts by weight of the magenta toner particles, 2 parts by weight of hydrophobic fine titanium oxide particles were externally added to prepare a magenta toner. Then, 5 parts by weight of this magenta toner and 95 parts by weight of a coated ferrite carrier having an average particle diameter of 45 µm, coated with a styrene-acrylate resin, were blended and charge quantity of the developer obtained was measured in the same manner as in Example 1 to find that it was −20.1 µC/g.

An OHT having a fixed image thereon was also prepared in the same manner as in Example 1, and the integral area of transmittance at 304 nm to 874 nm was determined to find that it was 33,861%.

Using this develper, images were reproduced by a color laser copying machine CLC1130, manufactured by CANON INC., to find that fixed images having a little unclear magenta color were obtained as compared with Example 2.

OHT images formed by this toner and projected on a screen with use of an OHP were seen dark as compared with Example 2.

What is claimed is:

1. A coloring agent which comprises coloring particles modified with a compound, wherein said compound is a compound represented by the following Formula (2):

$$R^{1a}\text{-}A^1\text{-}R^3\text{---}N\!=\!N\text{---}R^4\text{-}A^2\text{-}R^{2a} \qquad (2)$$

wherein $R^{1a}$ is a long-chain aliphatic hydrocarbon group having 6 to 30 carbon atoms, or an aryl group having 6 to 12 carbon atoms which has an alkyl group having 1 to 20 carbon atoms (the former carbon atoms excluding those of the alkyl group moiety); $R^{2a}$ is a carboxyl group, a carboxylic acid group, a sulfuric ester group, a sulfate, a sulfonic acid group, a sulfonic acid group having a salt structure, or an aliphatic hydrocarbon group having 1 to 20 carbon atoms which has as a substituent at least one of a carboxyl group, a carboxylic acid group, a carboxylic acid salt group, a sulfuric ester group, a sulfate, a sulfonic acid group or a sulfonic acid group having a salt structure or an aromatic hydrocarbon group having 6–20 carbon atoms which has as a substituent at least one of a carboxyl group, a carboxylic acid group, a carboxylic acid salt group, a sulfuric ester group, a sulfate, a sulfonic acid group or a sulfonic acid group having a salt structure; $R^3$ and $R^4$ may be the same or different and are alkylene groups having electron-attracting groups on the carbon atoms adjoining to the azo group; $A^1$ may be absent, or represents at least one of an ester linkage, an amide linkage, a urethane linkage or an ether linkage; and $A^2$ may be absent, or represents at least one of an ester linkage, an amide linkage, a urethane linkage or an ether linkage.

2. The coloring agent according to claim 1, wherein $R^{1a}$ is a long-chain aliphatic hydrocarbon group having 10 to 22 carbon atoms, or a phenyl group which has as a substituent an alkyl group having 1 to 18 carbon atoms; $R^{2a}$ a carboxyl group, a carboxylic acid group, a sulfuric ester group, a sulfate, a sulfonic acid group, a sulfonic acid group having a salt structure, or an aliphatic hydrocarbon group having 1 to 20 carbon atoms or aromatic hydrocarbon group having 6 to 20 carbon atoms wherein each of, said aliphatic hydrocarbon group having 1 to 20 carbon atoms and said aromatic hydrocarbon group having 6 to 20 carbon atoms has at least one of a carboxyl group, a carboxylic acid group, a carboxylic acid salt group, a sulfuric ester group, a sulfate, a sulfonic acid group or a sulfonic acid group having a salt structure as a substituent; $R^3$ and $R^4$ may be the same or different and are alkylene groups having 2 to 6 carbon atoms and having cyano groups on the carbon atoms adjoining to the azo group; $A^1$ may be absent, or represents an ester linkage or an amide linkage; and $A^2$ may be absent, or represents an ester linkage or an amide linkage.

3. The coloring agent according to claim 1, wherein said compound is a compound selected from the group consisting of compounds represented by the following formulas (I to (vi):

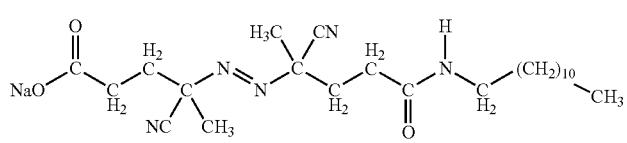

(I)

-continued

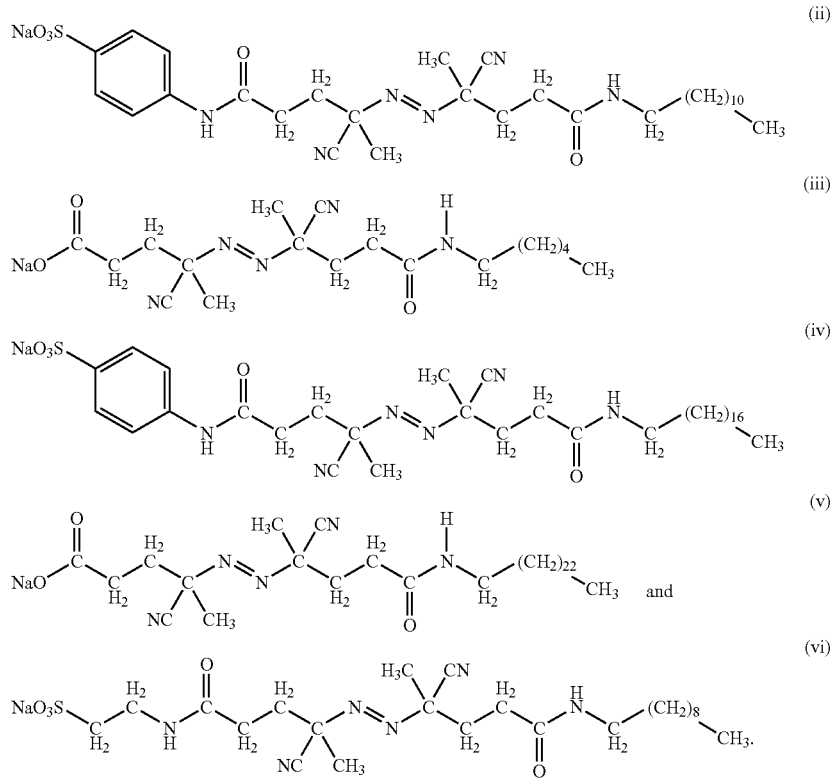

4. A toner which comprises toner particles containing at least a binder resin and a coloring agent according to any one of claims 1 or 3.

5. A toner which comprises toner particles containing at least a binder resin and a coloring agent;
said coloring agent comprising coloring particles modified with a compound, wherein said compound is a compound represented by the following Formula (2):

$$R^{1a}\text{-}A^1\text{-}R^3\text{---}N\text{=}N\text{---}R^4\text{-}A^2\text{-}R^{2a} \quad (2)$$

wherein $R^{1a}$ is a long-chain aliphatic hydrocarbon group having 6 to 30 carbon atoms, or an aryl group having 6 to 12 carbon atoms which has an alkyl group having 1 to 20 carbon atoms (the former carbon atoms excluding those of the alkyl group moiety); $R^{2a}$ is a carboxyl group, a carboxylic acid group, a sulfuric ester group, a sulfate, a sulfonic acid group, a sulfonic acid group having a salt structure, or an aliphatic hydrocarbon group having 1 to 20 carbon atoms which has as a substituent at least one of a carboxyl group, a carboxylic acid group, a carboxylic acid salt group, a sulfuric ester group, a sulfate, a sulfonic acid group or a sulfonic acid group having a salt structure; or an aromatic hydrocarbon group having 6–20 carbon atoms which has as a substituent at least one of a carboxyl group, a carboxylic acid group, a carboxylic acid salt group, a sulfuric ester group, a sulfate, a sulfonic acid group or a sulfonic acid group having a salt structure; $R^3$ and $R^4$ may be the same or different and are alkylene groups having electron-attracting groups on the carbon atoms adjoining to the azo group; $A^1$ may be absent, or represents at least one of an ester linkage, an amide linkage, a urethane linkage or an ether linkage; and $A^2$ may be absent, or represents at least one of an ester linkage, an amide linkage, a urethane linkage or an ether linkage.

6. The toner according to claim 5, wherein said toner particles have said modified coloring particles fixed to the surfaces.

7. The toner according to claim 5, wherein said toner particles are:
toner particles produced by fixing the surface-modified coloring agent to the surfaces of the toner particles; or
toner particles produced by mixing (i) an emulsion prepared by emulsifying in water a dispersion prepared by dispersing the surface-modified coloring agent in an organic solvent and (ii) an aqueous dispersion of toner base particles having at least the binder resin, to incorporate the coloring agent into the toner base particles.

8. The toner according to claim 5, wherein said toner particles are toner particles produced by dispersion polymerization.

* * * * *

UNITED STATES PATENT AND TRADEMARK OFFICE
CERTIFICATE OF CORRECTION

PATENT NO. : 7,049,039 B2  
APPLICATION NO. : 10/151140  
DATED : May 23, 2006  
INVENTOR(S) : Yayoi Tazawa et al.

It is certified that error appears in the above-identified patent and that said Letters Patent is hereby corrected as shown below:

ON TITLE PAGE AT ITEM (56) U.S. PATENT DOCUMENTS

"2003/0217676 A1" should read --2003/0217672 A1--.

COLUMN 3

Line 42, "elco-" should read --eico--.

COLUMN 26

Line 33, "$R^{2a}$" should read --$R^{2a}$ is--;  
Line 38, "atoms wherein each of," should read --atoms,--;  
Line 52, "(I to" should read --(i) to--; and  
Line 57, "(I)" should read --(i)--.

COLUMN 27

Line 36, "1" should read --2--.

Signed and Sealed this

Fifth Day of December, 2006

JON W. DUDAS  
*Director of the United States Patent and Trademark Office*